Patented Mar. 13, 1934

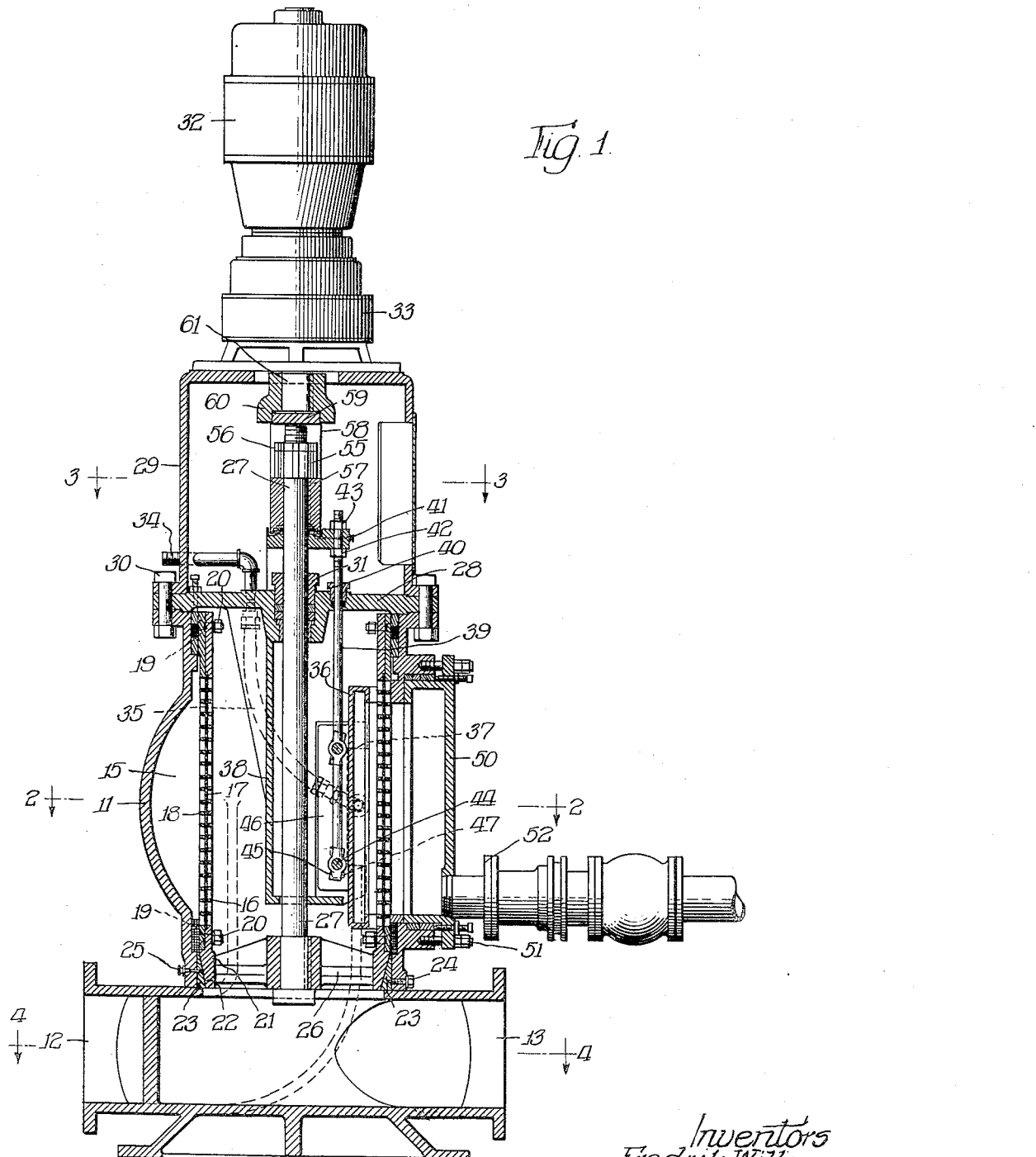

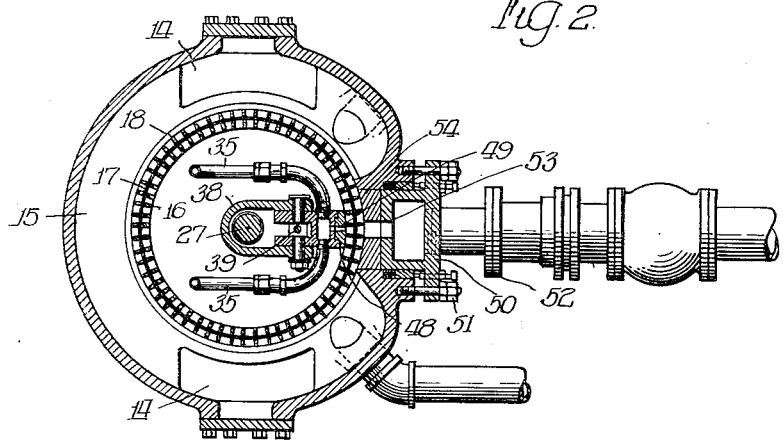
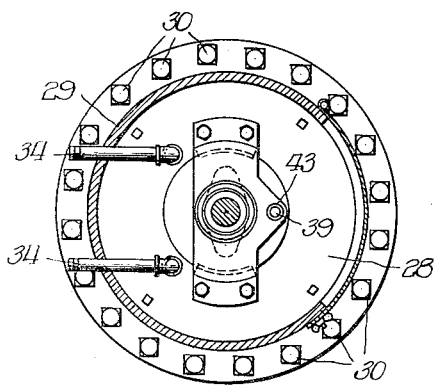
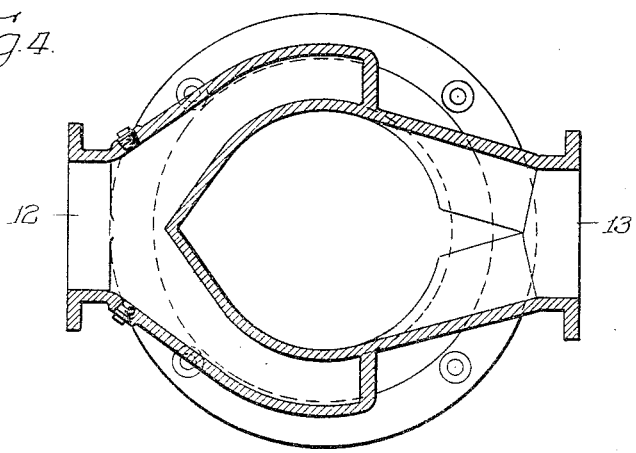

1,950,466

UNITED STATES PATENT OFFICE 1,950,466

AUTOMATIC SELF-CLEANING STRAINER

Fredrik Wille, Albert J. Hulse, and William M. Kirk, Chicago, Ill., assignors to H. A. Brassert & Company, Chicago, Ill., a corporation of Illinois Application November 14, 1931, Serial No. 575,036

5 Claims. (Cl. 210—167)

This invention relates to a new and improved strainer or filter, and more particularly to a strainer or filter of the automatic self-cleaning type.

Our invention relates to a method and apparatus for filtering of the general type disclosed in the patent to H. C. Heaton, No. 1,591,821. This patent describes a method and apparatus including a fine filter supported between two perforated cylinders and revolved in the path of fluid flow, the filter being automatically cleaned by backwashing the solids with a counter-flow of fluid continuously operating upon a changing small area of the filter.

In operating this type of strainer, we have found that after a time the filter, particularly if it is a very fine mesh, becomes more or less coated with matter which cannot be backwashed, such as fibres which become entangled in the weave of the screen or cloth and which therefore cannot be backwashed or even blown out with steam or air. It therefore becomes necessary from time to time to exchange the filter cloth.

In the construction of the strainer heretofore, the cylinders enclosing the filter cloth have been two solid drums of conical shape with the filter held between them; in installing the filter cloth it was laid against the inner drum which was then inserted into the outer drum. It was very difficult to do this without damaging the screen, particularly if it consisted of a very fine filter cloth. It was even necessary to heat the outer drum to take advantage of its expansion, to be able to insert the inner drum without damaging the filter cloth, but means of heating are not always available, and even with this method, the greatest care is required in order not to lacerate the filter cloth. Furthermore, the two drums and filter cloth become frozen together after they have been in operation for some time and it is very difficult to take them apart in order to insert the new filter cloth.

Another important improvement in the design and operation of such filters is a means of holding the floating orifice for backwashing tightly against the inner drum. We have found that if this is not done, considerable leakage takes place between the inner drum and the orifice, permitting filtered water to leak back with the backwashing water into the sludge discharge.

Another improvement we have made in order to prevent leakage and to compensate for air, is to make the chamber, which carries off the sludge, separate, adjustable and removable from the main body of the strainer. When this chamber was rigid, the continuous wear between the outside revolving drum and the surface of the chamber would cause wear between the two, which would eventually start leakage of the incoming water, by-passing it between the outer drum and the wall of the sludge chamber into the sludge chamber without going through the filter, thereby seriously impairing the efficiency of the strainer.

The removable sludge chamber can be taken off, permitting the cleaning of the holes in the outer drum and thorough inspection of the filter cloth without taking the strainer apart.

In order to prevent leakage between the outside drum and the casing through wear of the revolving parts against the outside casing, we propose to bevel the lower part of the revolving cylinder so as to provide a conical bearing surface which will support the revolving part on the base of the casing, and we insert a wedge shaped circular piece between the revolving and stationary parts, which will take up the wear. By having a conical bearing surface, the wear is taken care of automatically by allowing the revolving drums to be lowered and held in the new position by means of the adjusting screw at the top of the strainer.

We have found that in the original application of the aforementioned inventions, with the flow of the water coming against the screen from one side onto the center of the revolving drum, that the one sided pressure caused an excessive friction and wear on the opposite side. Another objection to this type of construction was that the water inlet and outlet from the strainer were on different levels, necessitating expensive pipe fittings when making the installation. We have invented a new form of rotating automatic strainer, in which the inlet and the outlet are on the same center line and in which the water flows in on the strainer from all sides, thereby balancing the pressure on the rotating drum.

It is an object of the present invention to provide a new and improved strainer or filter of the self-cleaning type.

It is a further object of the invention to provide a construction in which the filter screen may be readily inspected and removed for repair or replacement.

It is also an object to provide a construction in which the rotating filter screen assembly is adequately supported and provided with means for taking up wear upon the contacting support surfaces.

It is an additional object to provide a construction in which the floating orifice for backwashing the filter screen is adjustably supported so it may be maintained in close contact with the rotating drum.

It is a further object to provide a construction in which the sludge receiving chamber is adjustable relative to the rotating drum to maintain proper contact and prevent leakage.

It is also an object to provide a construction in which the flow of fluid into the filtering drum takes place from practically all sides so as to minimize lateral thrust upon the screening drum and thus to equalize wear upon the bearings and contacting surfaces.

Other and further objects will appear as the description proceeds.

We have shown a preferred embodiment of our invention in the accompanying drawings, in which—

Figure 1 is a vertical section through the filter construction;

Figure 2 is a horizontal section taken on line 2—2 of Figure 1;

Figure 3 is a horizontal section taken on line 3—3 of Figure 1; and

Figure 4 is a horizontal section taken on line 4—4 of Figure 1.

The body or housing 11 of the filter is shown as a casting having the inlet passage 12 and outlet passage 13 integrally cast therewith. The relationship of these passages is best shown in Figure 4. The inlet passage 12 divides into two passages 14 which discharge into the chamber 15 which substantially surrounds the screening drum assembly which comprises the inner perforate drum 16, the filter screen 17 and the outer perforate sections 18, which sections together completely enclose the screen 17. The sections 18 are secured to the drum 16 by means of the bolts 19 and nuts 20.

The lower solid portion 21 of the drum 16 is formed with an outer conical face 22 which bears on the opposed conical bearing member 23. The bearing member is held in place by the locking studs 24 and its bearing face is lubricated by means of the lubricant channels 25. The lower portion 21 of the drum is connected by spider 26 to the vertical shaft 27 to which the spider is keyed. The top of the housing 11 is closed by means of the plate 28 which also carries the upper casing 29, these two parts being secured to the housing 11 by bolts 30. The shaft 27 passes through plate 28, the gland 31 being provided to prevent fluid leakage. The shaft 27 is driven by motor 32 through the reduction gear 33. The shaft 27 is threaded at its upper end and carries the adjusting nut 55 and lock nut 56. The nut 55 bears on collar 57 which is keyed to the shaft 27. The collar 57 is carried on a roller bearing on the support 41. The collar 57 is rigidly connected to the U-shaped member 58 which has an upper cross portion 59 engaging a sleeve 60 which is keyed to the shaft 61 driven by the reduction gear 33. It will be apparent that by means of nuts 55 and 56, the shaft 27 may be adjusted vertically without affecting the drive connection with the motor.

The pipes 34 lead into the casing 29 and down through the plate 28 where they connect to the flexible tubes 35 which in turn connect to the backwashing header 36. This header 36 is provided with horizontally extending lugs 37 indicated in broken lines in Figure 1, which fit in corresponding grooves in the downward extension 38 of the cover plate 28. This extension 38 therefore supports the header 36 while permitting a limited horizontal movement. This horizontal movement is caused by the vertically extending rod 39 which passes through the gland 40 in plate 28 and has its upper end adjustably secured to the support 41 by means of nuts 42 and 43. The rod 39 carries the cross studs 44 which fit in angular slots 45 in the flanges 46 of the header and also fit in vertical slots 47 in the extension 38. It will be apparent that through studs 44 and the slots 45 and 47, a vertical movement of the rod 39 will cause a horizontal movement of the header 36. As best shown in Figure 2, the header 36 is provided with a face plate 48 of suitable bearing metal, the face plate being formed with the narrow, vertically extending slot 49 through which the backwash fluid is directed upon the rotating screen assembly.

The sludge receiving casing 50 is secured to the housing 11 by means of bolts 51. This casing 50 has the pipe 52 connected thereto to carry off the sludge and backwashing fluid. The face of the casing 50 is formed with a vertical slot 53 located opposite the slot 49 on the backwasher, this slot 49 being of such width as to entirely cover any perforations in the plates 18, any part of which may be opposite the slot 49. The casing 50 has the face plate 54 secured thereto, this face plate being shaped to conform to the contour of the rotating cylinder and being formed of suitable bearing metal or the like.

The necessary packing and packing adjusting means are provided where required, as shown in the drawings, but as these form no part of the present invention they need not be described in detail.

In the use of the filter, the fluid to be filtered comes in through the passage 12 and through the branches 14 is led into the chamber 15 where it contacts with substantially the entire circumference of the rotating cylinder assembly.

The fluid passes through the perforations in the separate plates 18, through the filter screen 17, and through the perforations in the cylinder 16. The solids or sludge are retained on the screen 17. The filtered fluid flows down the inside of the cylinder 16 and out through outlet passage 13.

As the filter cylinder rotates, each vertical row of perforations is progressively brought into registration with the slot 49. A backwashing fluid under pressure is directed through this slot and forces the sludge through the slot 53 from which it flows off through the sludge receiving casing 50 and pipe 52. This backwashing fluid may be liquid or gases. It may be steam or air or a mixture of steam or air and a liquid. It may be water and be taken from the flow being filtered.

When the filter cloth becomes damaged or clogged, it may be replaced by removing the plates 18 from cylinder 16 by taking out the bolts 19. The filter cloth may be cut in sections of the same size as sections 18 so that parts may be removed and replaced at a time or one piece of cloth may be used to cover the entire cylinder, its removal and replacement being much facilitated by the fact that the outer cylinder is formed of separately removable sections.

While we have shown one preferred form of our invention, this is to be understood as illustrative, as our invention is capable of wide variation in design and construction to meet varying conditions and requirements and we contemplate such changes and modifications as come within the spirit and scope of the appended claims.

We claim:

1. In a filter, a rotating filter drum, a conical bearing for the lower edge of the drum, a conical face on the lower portion of the drum engaging the bearing, and a separate adjustable support for the drum whereby it may be adjusted relative to the bearing.

2. In a rotating self-cleaning strainer, a rotating screen assembly, a header having an orifice adapted to discharge backwashing fluid against the screen assembly, and adjustable supporting means for the header whereby it may be adjusted toward or away from the screen assembly.

3. In a rotating self-cleaning strainer, a rotating screen assembly, means for causing a backwashing flow through the screen, a sludge chamber adjacent the screen adapted to receive the backwash flow and sludge from the screen, and means for adjusting the sludge chamber toward or away from the screen assembly.

4. In a rotating self-cleaning strainer, a rotating screen assembly, a header having an orifice adapted to discharged backwashing fluid adjacent and against the screen assembly, and means for adjusting the relative positions of the header and screen assembly to vary the clearance between the orifice and assembly.

5. In a rotating self-cleaning strainer, a rotating screen assembly, means for causing a backwashing flow through the screen, a sludge chamber adjacent the screen adapted to receive the backwash flow and sludge from the screen, and means for adjusting the relative positions of the screen and sludge chamber to vary the clearance between the screen and chamber.

FREDRIK WILLE.
ALBERT J. HULSE.
WM. M. KIRK.